US 8,201,746 B2

(12) United States Patent
Guo et al.

(10) Patent No.: US 8,201,746 B2
(45) Date of Patent: Jun. 19, 2012

(54) ON-CHIP ANTENNA AND A METHOD OF FABRICATING THE SAME

(75) Inventors: Li Hui Guo, Singapore (SG); Hong Yu Li, Singapore (SG); Min Tang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 880 days.

(21) Appl. No.: 12/161,958

(22) PCT Filed: Jan. 24, 2007

(86) PCT No.: PCT/SG2007/000019
§ 371 (c)(1),
(2), (4) Date: Nov. 21, 2008

(87) PCT Pub. No.: WO2007/086809
PCT Pub. Date: Aug. 2, 2007

(65) Prior Publication Data
US 2011/0036912 A1     Feb. 17, 2011

Related U.S. Application Data

(60) Provisional application No. 60/761,571, filed on Jan. 24, 2006.

(51) Int. Cl.
*G06K 19/06* (2006.01)
(52) U.S. Cl. .................................. 235/492; 235/487
(58) Field of Classification Search ............ 235/492, 235/487, 380, 382, 375
See application file for complete search history.

(56) References Cited

U.S. PATENT DOCUMENTS

| 4,814,849 A * | 3/1989 | Schrenk ................. 257/659 |
| 6,435,415 B1 * | 8/2002 | Catte ..................... 235/492 |
| 6,637,665 B2 * | 10/2003 | Salzgeber ............... 235/492 |
| 6,646,328 B2 | 11/2003 | Tsai |
| 2006/0049986 A1 | 3/2006 | Dunn et al. |
| 2006/0049995 A1 | 3/2006 | Imaoka et al. |

FOREIGN PATENT DOCUMENTS
WO    WO0161644    8/2001

OTHER PUBLICATIONS

A. Aerial, et al., A New Contactless Smart Card IC Using an On-Chip Antenna and as Asynchronous Microcontroller, IEEE Journal of Solid-State Circuits, vol. 36, No. 7, 2001, pp. 1101-1107.

(Continued)

*Primary Examiner* — Karl D Frech
(74) *Attorney, Agent, or Firm* — K. David Crockett, Esq.; Niky Economy Syrengelas, Esq.; Crockett & Crockett, PC

(57) ABSTRACT

An on-chip antenna fabricated on a chip for wireless communication is disclosed. The on-chip antenna includes a first dielectric layer arranged on a surface of the chip of the radio frequency identification tag, a grounded shielding layer arranged on the first dielectric layer, a second dielectric layer arranged on the grounded shielding layer, and a planar antenna arranged on the second dielectric layer above the grounded shielding layer. A radio frequency identification tag with an on-chip antenna and a method of fabricating an on-chip antenna on a chip for wireless communication are also disclosed.

44 Claims, 3 Drawing Sheets

OTHER PUBLICATIONS

Hitachi Maxwell, Maxwell Announces Coil-on-Chip RFID Technology for Life Sciences Market, RFid Gazette, Apr. 27, 2004.

R. Imura, et al., The World's Smallest RFID μ-Chip, Bringing About New Business and Lifestyles, 2004 Symposium on VLSI Circuits, Digest of Technical papers.

C. Yue, et al., On-Chip Spiral Inductors with Patterned Ground Shields for Si-Based RF IC's, IEEE Journal of Solid State Circuits, vol. 33, No. 5, May 1998.

* cited by examiner

ZY-Smith Chart

To diodes of rectifier circuit of RFID tag/transponder

ON-CHIP ANTENNA AND A METHOD OF FABRICATING THE SAME

CROSS-REFERENCE TO RELATED APPLICATION

This application claims the benefit of priority of U.S. provisional application No. 60/761,571 filed Jan. 24, 2006, the contents of which being hereby incorporated by reference in its entirety for all purposes.

FIELD OF THE INVENTION

The present invention relates to the field of antennas for wireless communication systems, and in particular, to an on-chip antenna fabricated on a chip of an Radio Frequency Identification (RFID) tag. It also relates to a method of fabricating the on-chip antenna on a chip of an RFID tag.

BACKGROUND OF THE INVENTION

In general, two transmission models can be used in an RFID system between a reader and a tag or transponder. The first model is a backscattering model, which is similar to a radar system, where the tag or transponder reflects the electromagnetic waves sent by the reader. The backscattering model is used mainly at higher frequency ranges, for example 915 MHz, 2.45 GHz and beyond. The antenna used in the backscattering model is a far-field antenna, for example dipole, slot or patch antenna. The planar area of an antenna used in the backscattering model is normally larger than at least 0.25 wavelength, for example about several centimeters for 2.45 GHz frequency. The second model is a magnetic coupling model and involves magnetic coupling between the reader and the tag or transponder through a pair of coils, which are the antenna for the reader, on the one hand, and the antenna of the tag or transponder, on the other hand. The second model is usually used for RFID applications with a short detecting distance at lower frequency range, for example 13.56 MHz.

There are two methods to build an antenna for an RFID tag. The first method is to fabricate the antenna on an assembly substrate and then assemble the antenna with a chip to form the tag or transponder. Antennas of this kind can be termed "off-chip" antennas as the antennas are not fabricated directly on the chip. The second method is to fabricate the antenna directly on the chip without additional assembling process, which is called an on-chip antenna (OCA). The OCA has a few advantages over the "off-chip" antenna. For an RFID tag with an OCA, the entire tag volume can be almost as small as the size of the chip of the tag. With such small dimensions, the tag can be embedded in many objects for a wide variety of applications. In addition, a low cost can be obtained for a tag with an OCA, since there are no separate assembling costs for the antenna and the chip.

The dimensions of a chip in a tag can be very small, for example in millimeter scale. Sub-millimeter dimensions are also possible if the chip is fabricated with advanced CMOS technology. In addition, the chip size can be further reduced with an increase of the tag's working frequency to a high frequency range. The reduction of the area of the tag reduces the cost of fabrication per tag.

Therefore, the dimensions of an OCA are limited by the chip's dimensions, in millimeter scale. With the small dimensions, it is not possible to fabricate a backscattering transmission model OCA on the chip of the tag for an RFID system working in a frequency range below 10 GHz. Therefore, the OCA has to use the magnetic coupling transmission model, where the antenna is a metal coil and forms a transformer with the metal coil of the reader antenna.

Several attempts have been made to fabricate an OCA on a chip of an RFID tag. Publication "A New Contactless Smart Card IC Using an On-Chip Antenna and an Asynchronous Microcontroller", A. Abrial et al, IEEE Journal of Solid-State Circuits, vol. 36, No. 7, 2001, pp. 1101-1107 discloses an OCA fabricated on a contactless smart card chip with 0.25 µm CMOS technology. The OCA has an area of 4×4 mm$^2$ and is working at 13.56 MHz.

Article "Maxwell Announces Coil-on-Chip RFID Technology for Life Sciences Market", Hitachi Maxwell, discloses another RFID tag with OCA working at 13.56 MHz on a chip area of 2.3×2.3 mm$^2$. The OCA is fabricated with 0.8-µm CMOS technology. Publication "The World's smallest RFID µ-chip, bringing about new business and lifestyles", Ryo Imura et al, 2004 Symposium on VLSI Circuits, Digest of Technical Papers" also discloses a µ-chip with OCA working at 2.45 GHz.

U.S. Pat. No. 6,646,328 discloses an antenna structure which is fabricated on a chip. The antenna structure includes a shielding layer, a dielectric layer and an antenna layer. The shielding layer is electrically floating and includes a plurality of mutually isolated regions. The entire antenna structure may be fabricated using conventional CMOS processes and the antenna is of strip-type.

Publication "On-Chip Spiral Inductors with Patterned Ground Shields for Si-Based RF IC's," C. Patrick Yue et al, IEEE Journal of Solid-State Circuits, Vol. 33, No. 5, May 1998 discloses a patterned ground shield inserted between an on-chip spiral inductor coil and a silicon (Si) substrate. The spiral inductor coil is fabricated within the interconnect layers in a Si CMOS process, normally with the top metal layer of the interconnect layers. The magnetic field generated by the inductor coil penetrates through to the Si substrate underneath. As the Si substrate used in a standard low cost CMOS process has low resistivity, an eddy-current is induced within the Si substrate by the magnetic field. This consumes the energy of inductor coil and lowers the inductor coil's quality-factor and performance. To prevent the generated magnetic field from penetrating into or through to the Si substrate, a polysilicon layer is arranged between the inductor coil and the Si substrate to form a shielding layer for the inductor coil.

There are discrepancies between the simulation and measurement results in the fabricated OCA structures of prior art devices. These discrepancies prove that the known OCA structures cannot be pre-designed. Therefore, an objective of the present invention is to provide an alternative OCA that advantageously avoids or at least reduces some of the above-mentioned drawbacks of prior art devices in an easy and economical manner.

SUMMARY OF THE INVENTION

In an embodiment of the invention, an on-chip antenna fabricated on a chip for wireless communication is provided. The on-chip antenna includes a first dielectric layer arranged on a surface of the chip of the radio frequency identification tag, a grounded shielding layer arranged on the first dielectric layer, a second dielectric layer arranged on the grounded shielding layer, and a planar antenna arranged on the second dielectric layer above the grounded shielding layer.

In another embodiment of the invention, a radio frequency identification tag with an on-chip antenna is provided. The radio frequency identification tag with an on-chip antenna, in a stacked arrangement includes a base portion including at least one integrated circuit, a matching network arranged on the base portion and electrically connected to the integrated circuit, a first dielectric layer arranged on the matching network, a grounded shielding layer arranged on the first dielectric layer, a second dielectric layer arranged on the grounded shielding layer, and a planar antenna arranged on the second dielectric layer above the grounded shielding layer and electrically connected to the matching network.

In a further embodiment of the invention, a method of fabricating an on-chip antenna on a chip for wireless communication is provided. The method includes depositing a first dielectric layer on a surface of the chip of the radio frequency identification tag, depositing a shielding layer on the first dielectric layer, depositing a second dielectric layer on the shielding layer, depositing a planar antenna with two terminals on the second dielectric layer, and grounding the shielding layer.

The following figures illustrate various exemplary embodiments of the present invention. However, it should be noted that the present invention is not limited to the exemplary embodiments illustrated in the following figures.

DETAILED DESCRIPTION OF THE INVENTION

Exemplary embodiments of an on-chip antenna, a radio frequency identification tag with an on-chip antenna and a method of fabricating an on-chip antenna are described in detail below with reference to the accompanying figures. In addition, although the invention is explained based on the exemplary embodiments described below, it is to be understood that many other possible modifications and variations can be made without departing from the scope of the invention as claimed.

Figure 1:
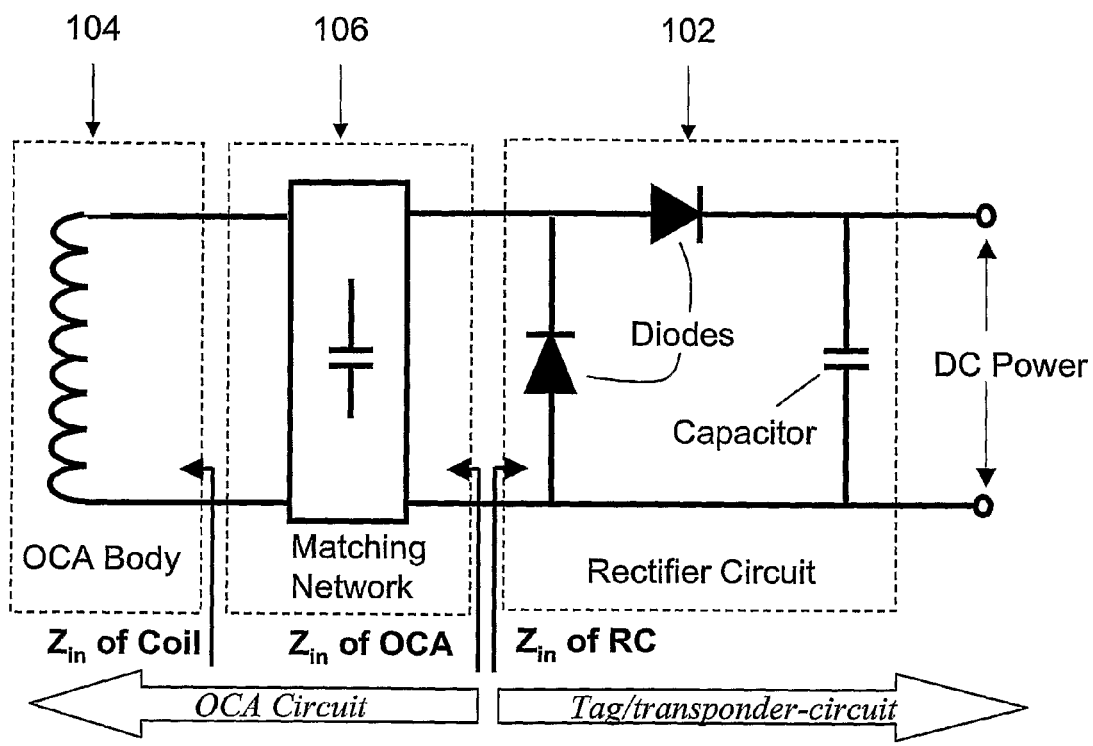
FIG. 1 shows a topology of a radio frequency identification tag with an on-chip antenna circuit according to an embodiment of the present invention.

FIG. 1 shows a topology of a radio frequency identification (RFID) tag with an on-chip antenna (OCA) circuit according to an embodiment of the present invention. The RFID tag includes two parts, namely a chip of the RFID tag or tag circuit and an OCA circuit. The tag circuit includes a rectifier circuit (RC) 102, connected with its one connecting terminal to the OCA circuit and with its other connecting terminal to a direct current (DC) source. The rectifier circuit 102 includes two diodes and a capacitor but is not so limited. The OCA circuit includes two sections, one section is an OCA body 104 and the other section is a matching network 106. The OCA body 104 includes a planar antenna or an antenna coil. The matching network 106 may include capacitors and inductors and any other suitable elements. However, the matching network 106 preferably includes capacitors only as inductors may share the energy stored in the antenna coil. The matching network 106 serves to ensure the delivery of maximum generated power from the OCA body 104 to the rectifier circuit 102. This is done when the input impedance of the OCA body 104 (Zin of antenna coil) is conjugately matched with the input impedance of the rectifier circuit 102 (Zin of RC).

Figure 2A:
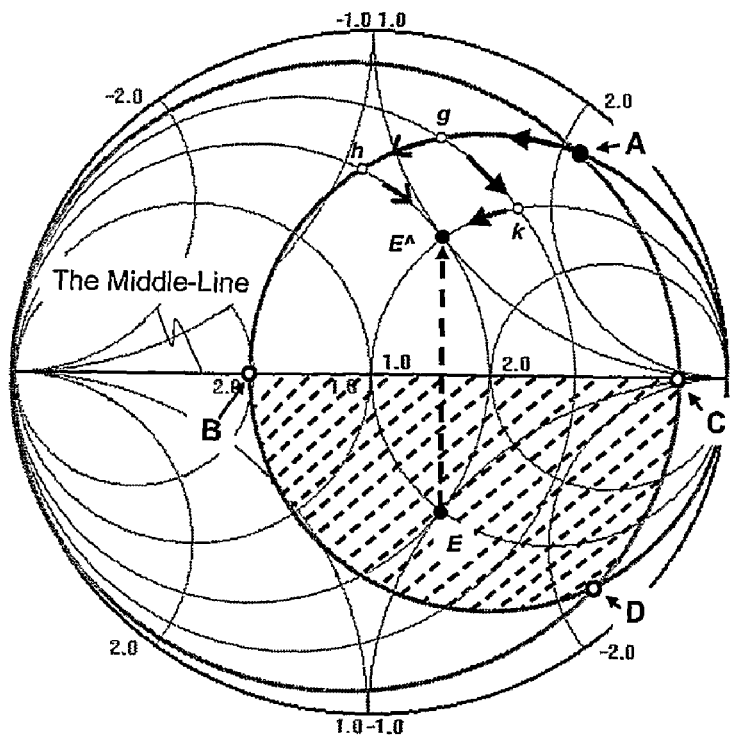
FIG. 2A shows a matching approach on a Smith Chart according to an embodiment of the present invention.
Figure 2B:
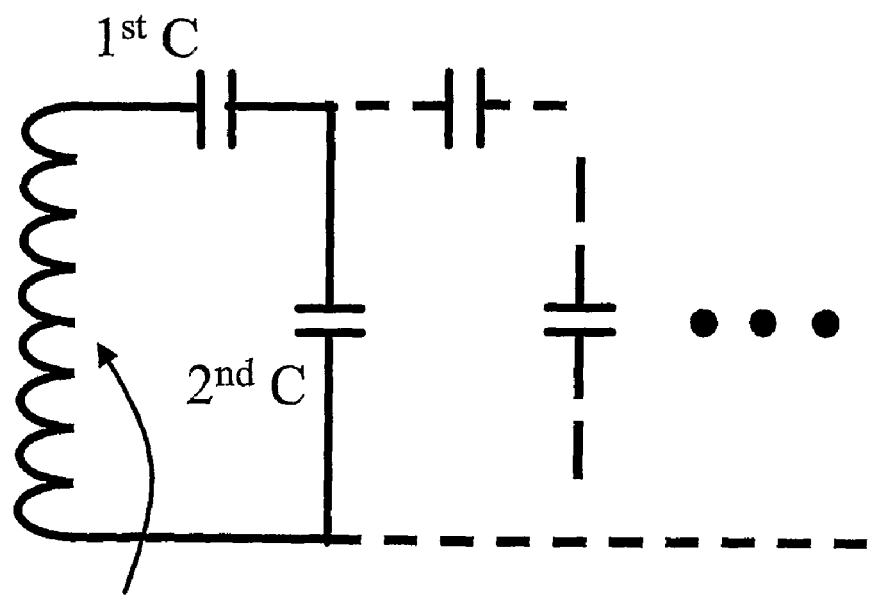
FIG. 2B shows a matching network of an on-chip antenna circuit according to an embodiment of the present invention.

FIG. 2A shows a matching approach on a Smith Chart according to an embodiment of the present invention and FIG. 2B shows a matching network of an on-chip antenna circuit according to an embodiment of the present invention. In FIG. 2A, as an illustration, the Zin of the OCA is at point A and the Zin of the RC is at point E on the Smith Chart. Therefore the conjugate $Z_{in}$ of RC is at the point $\hat{E}$. In general, two or more than two capacitors may be used in the matching network with the first capacitor connecting the coil of the OCA body in series and the second capacitor connecting in parallel. More capacitors may be connected subsequently with the second capacitor if necessary, with the next capacitor in series and the following capacitor in parallel as shown in FIG. 2B. As an example, if two capacitors are used in the matching network, the first capacitor connected in series with the antenna coil of the OCA body moves the impedance from the point A to the point h in FIG. 2A, and the second capacitor connected in parallel to the first capacitor moves the impedance from the point h to the conjugate point $\hat{E}$. Another example is to assume that three capacitors may be used in the matching network. The first capacitor connected in series with the coil of the OCA body moves the impedance to the point g, the second capacitor connected in parallel moves the impedance to the point k, and the third capacitor connected in series moves the impedance to the point $\hat{E}$ as shown in FIG. 2A. In another example, if the point $\hat{E}$ falls on the arc AB, the resistance circle through the point A, only one capacitor is necessary in the matching network and that capacitor is connected with the coil in series. In another example, if the point $\hat{E}$ falls on the arc AC, the reactance circle through the point A, only one capacitor is necessary in the matching network and that capacitor is connected with the coil in parallel.

Figure 3A:
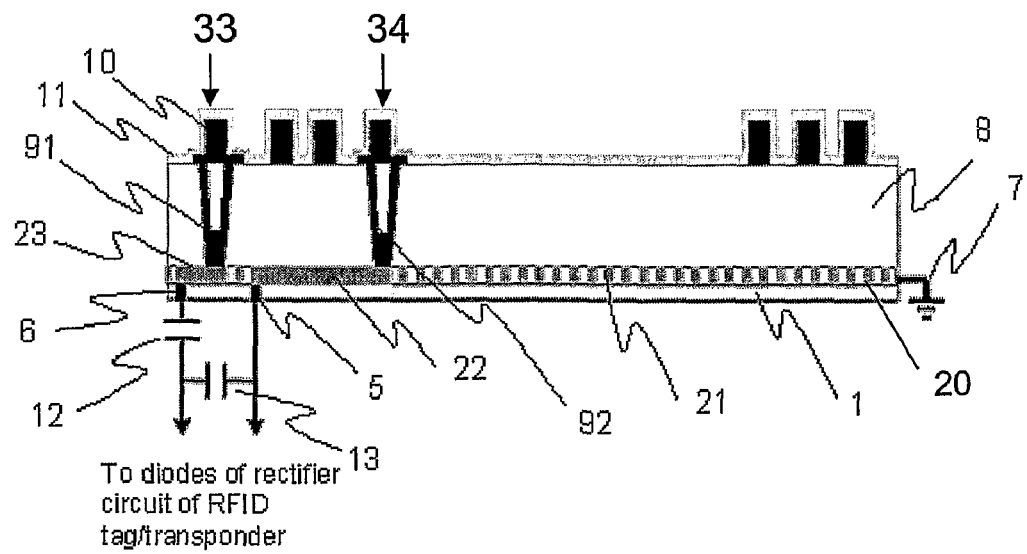
FIG. 3A shows a cross-sectional view of an on-chip antenna circuit according to an embodiment of the present invention.
Figure 3B:
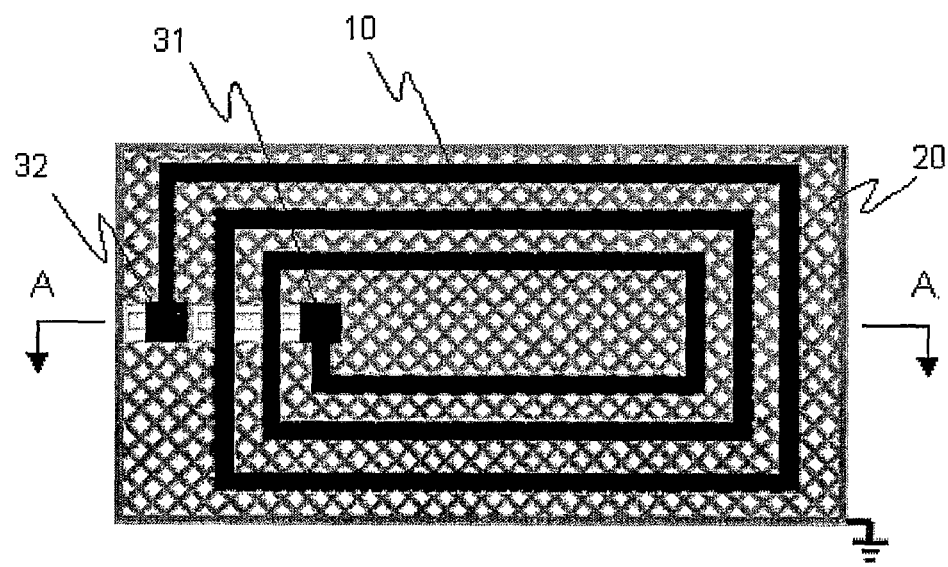
FIG. 3B shows a top view of an on-chip antenna circuit according to an embodiment of the present invention.

FIG. 3A shows a cross-sectional view of an on-chip antenna circuit according to an embodiment of the present invention and FIG. 3B shows a top view of an on-chip antenna circuit according to an embodiment of the present invention. As shown in FIG. 3A, the OCA circuit includes a matching network comprising capacitors 12 and 13, as the second section of the OCA circuit, as described above. Furthermore, the OCA circuit comprises, as the first section thereof, a first dielectric layer 1 with two vias 5 and 6 extending therethrough, a grounded shielding layer 20 with two conductive layers or redistribution lines 22 and 23, a second dielectric layer 8 with two vias 91 and 92 extending therethrough, an antenna in form of an electrically conductive track or coil 10 with two terminals 33 and 34 and a passivation layer 11. According to the invention, the OCA circuit is fabricated on a chip front surface of a wireless communication device or for example an RFID tag or transponder, meaning that the first dielectric layer 1 is deposited on said surface of the RFID tag or transponder with the subsequent layers mentioned above deposited thereon in a stacked layer arrangement. The RFID tag, in turn, may be an integrated circuit fabricated in or on a silicon wafer and includes two terminals from a rectifier circuit for connection with the OCA circuit.

The matching network includes two terminals and each terminal of the matching network is connected to a respective terminal 33 and 34 of the antenna coil 10 through a connecting structure so as to provide an electrical connection between the matching network and the respective terminals 33 and 34 of the antenna coil 10. In the embodiment shown in FIGS. 3A and 3B, each connecting structure includes a respective one of the vias 5 and 6 in the first dielectric layer 1 connecting one terminal of the matching network to a respective one of the conductive layers or redistribution lines 22 or 23 in the grounded shielding layer 20, and a respective one of the vias 91 and 92 in the second dielectric layer 8 connecting the respective conductive layer or redistribution line 22 or 23 in the grounded shielding layer 20 to one of the terminals 33 and 34 of the antenna coil 10. In this shown embodiment of the invention, the conductive layers or redistribution lines 22 and 23 are formed in a respective opening in the grounded shielding layer 20 in plane therewith, but insulated therefrom.

In an alternative embodiment (not shown), no conductive layers or redistribution lines are formed in the respective two openings in the grounded shielding layer 20. In this embodiment, each connecting structure may include a single via extending through the first dielectric layer 1, the opening provided in the grounded shielding layer 20 and the second dielectric layer 8, and electrically connecting each terminal of the matching network to the respective terminals of the antenna coil 10.

Since the OCA body sit on matching network and the tag circuit or the chip of the radio frequency identification tag, magnetic field generated by the antenna coil 10 penetrates through to the tag circuit thereby inducing eddy-current in the tag circuit and influencing the functionality of the tag circuit. The shielding layer 20 of the OCA according to the invention is grounded so as to screen out the influence of the antenna coil 10 on the functionality of the tag circuit and vice versa even if a low frequency range is used. The grounded shielding layer 20 may be arranged over the entire surface of tag circuit or the chip of the radio frequency identification tag. This is so that the $Z_{in}$ of the antenna coil 10 can be accurately designed and estimated by a commercial EM design tool on a conventional workstation or personal computer. The grounded shielding layer 20 may e.g. be connected to the common ground 7 of the tag circuit underneath.

A suitable metal layer having a continuous surface, for example Al or Cu but not so limited, is deposited on the first dielectric layer 1 and is patterned to form a mesh structure 21 to form the grounded shielding layer 20 as shown in FIG. 3A. Alternatively, instead of a meshed layer, the continuous metal layer may remain non-patterned and serve as a continuous grounded shielding layer 20.

The metal layer may also be patterned to form two conductive layers or redistribution lines 22, 23, to redistribute the terminals of the matching network introduced through the vias 5 and 6 for conveniently connecting with the respective terminals of the antenna coil 10. The conductive layers or redistribution lines 22 and 23 may be formed by corresponding patterning from the metal layer forming the grounded shielding layer 20. However, the redistribution lines 22 and 23 must be electrically isolated from the grounded shielding layer 20. As an alternative, the metal layer may also be patterned to form two openings therein instead of two conductive layers or redistribution lines 22 and 23, thereby allowing direct connection between the matching network and the antenna coil 10 as earlier described. The thickness of the metal layer can be from about 0.1 μm to about 5 μm, but not so limited.

As described above, the matching network is constructed, according to the embodiment shown in FIG. 3A, by the two capacitors 12 and 13. The matching network may, however, be constructed differently. As an example, it may be fabricated with the tag circuit using complementary metal-oxide-semiconductor (CMOS) front-end-of-line (FEOL) process or back-end-of-line (BEOL) process, thereby enabling the terminals of the tag chip to be extended to the interface between the OCA body and the matching network. If the terminals of the tag chip are terminated at the rectifier circuit, the capacitors of the matching network may be fabricated top-up on the tag chip using metal-insulator-metal (MIM) structure and by an additional CMOS BEOL process loop.

The first dielectric layer 1 may be silica ($SiO_2$), silicon nitride ($Si_3N_4$), benzocyclobutene (BCB), polyimide or conventional resin materials but not so limited. The average thickness of the first dielectric layer 1 may be about 0.01 μm to about 20 μm but not so limited. The performance of the OCA might be reduced if the average thickness is less than about 0.01 μm and the fabrication cost might be too high if the average thickness is over 20 μm. The vias 5 and 6 may be formed from any suitable metals, for example aluminum (Al), copper (Cu), nickel (Ni), titanium (Ti), tantalum (Ta) but not so limited.

As an example, the first dielectric layer 1 may be a 15 μm $SiO_2$ layer deposited on a silicon wafer on which the tag circuit is formed, with standard Plasma-Enhanced Chemical Vapor Deposition (PECVD) facility. There may be a few challenges when depositing the $SiO_2$ layer and creating the vias. One of the challenges for the deposition process is wafer warp caused by the $SiO_2$ layer because the $SiO_2$ layer is relatively thick and introduces a relatively strong strain on the silicon wafer. Based on the standard recipe for PECVD $SiO_2$ deposition with silane ($SiH_4$) and nitrous oxide ($N_2O$) as precursors, the deposition process can be optimized by adding nitrogen into the $SiO_2$ layer which may be effective to reduce the wafer warp.

Another challenge may come from the etching of deep via in the thick $SiO_2$ layer. The deep via etching has two issues when compared to a relatively shallow via etching in standard CMOS process, namely photoresist erosion due to the lack of sufficient etch-selectivity from a high etch rate process and partial via-etch due to severe polymer build-up. For optimization of the via etching, a hardmask scheme with $Si_3N_4$ of approximately 2 μm in thickness may be utilized, along with a modified via-etching involving multiple etch steps and dynamically adjusting the ratio of $O_2/C_4F_8$, for example from an initial ratio of 1:1 to 2:1 when reaching towards bottom of the via. Meanwhile, a via-cleaning of argon (Ar) and oxygen ($O_2$) plasma may be in situ applied during etching to prevent polymer accumulation at the via bottom. Subsequently, the via may be filled with Cu through a standard damascene metallization process of CMOS BEOL with slightly modified recipes, including seed or barrier deposition, Cu electrochemical plating (Cu-ECP) and chemical-mechanical polishing (CMP).

The second dielectric layer 8, with thickness of about 3 μm to about 40 μm, is formed on the grounded shielding layer 20. The second dielectric layer 8 may be of the same material as first dielectric layer 1, for example $SiO_2$, $Si_3N_4$, BCB, polyimide, or conventional resin materials, but not so limited. For low fabrication cost, spin-on and photo-developable BCB, polyimide and conventional resin material may be preferred selections. Two vias 91, 92 are formed in the second dielectric layer 8 and the vias 91, 92 may be of the same material as the vias 5, 6 in the first dielectric layer 1 and may be formed from any suitable metal, for example Al, Cu, Ni, Ti, Ta or by their stacks but not so limited.

A conductive layer is deposited on the second dielectric layer 8 and patterned to form the planar antenna or antenna coil 10. The antenna coil 10 is preferably fabricated on the second dielectric layer 8 from a suitable metal for example Cu and by a suitable metallization technology such as electroplating technology to achieve a relative thick metal layer. However, any other kind of metallization technology can also be applied. The thickness for the metal layer ranges from about 1 μm to about 20 μm, but not so limited.

In the embodiment shown in FIG. 3A, a passivation layer 11 is deposited on the antenna coil 10 to protect the OCA and the chip of tag or transponder. The passivation layer 11 may be any suitable dielectric materials for example $Si_3N_4$. The average thickness of the passivation layer 11 ranges from about 0.1 μm to about 1 μm, but not so limited.

In FIG. 3B, the coil of the OCA is shown to be spirally designed and fabricated on the second dielectric layer. In FIG. 3A, the coil is illustrated to spiral in a circular shape but, it may also spiral in a rectangular, triangle or any other suitable shapes. The voltage or power generated in the antenna coil 10 of the OCA is induced through coupling with a coil of a reader antenna. The antenna coil 10 of the OCA includes two terminals and the two terminals of the coil 10 are electrically connected with the top surface of the two deep-vias 91 and 92 through pads 31 and 32. From the top-view, the respective cross-section of the pads 31 and 32 can be equal to or larger than the width of the coil 10 or cross-section of the coil 10. The function of the pads 31 and 32 is to ease the alignment of the respective deep-via 91 or 92 with the respective terminal of the coil 10. The coil 10 of the OCA is shown to be fabricated within the dimensions of the grounded shielding layer 20 so as to screen out the influence of the circuits underneath the OCA body on the coil 10.

A favorable size of the OCA circuit may be from about 0.04 $mm^2$ to about 25 $mm^2$. This dimension is within the size of a normal chip from CMOS fabrication.

The aforementioned description of the various embodiments has been presented for purposes of illustration and description. It is not intended to be exhaustive or to limit the invention to the precise form disclosed, and obviously many modifications and variations are possible in light of the disclosed teaching. It is intended that the scope of the invention be defined by the claims appended hereto.

What is claimed is:

1. An on-chip antenna fabricated on a chip for wireless communication, the on-chip antenna comprising:
   a first dielectric layer arranged on a surface of the chip of the radio frequency identification tag;
   a grounded shielding layer arranged on the first dielectric layer;
   a second dielectric layer arranged on the grounded shielding layer; and
   a planar antenna arranged on the second dielectric layer above the grounded shielding layer.

2. The on-chip antenna of claim 1, wherein the planar antenna comprises two terminals and two openings are provided in the grounded shielding layer below the terminals.

3. The on-chip antenna of claim 2, wherein a conductive layer is arranged within each of the openings in plane with the grounded shielding layer and isolated therefrom.

4. The on-chip antenna of claim 3, wherein the conductive layers in the respective openings and the grounded shielding layer are made from a single metal layer.

5. The on-chip antenna of claim 4, wherein the metal layer is selected from the group consisting of aluminum and copper.

6. The on-clip antenna of claim 4, wherein the metal layer has a thickness between 0.1 urn and 5 pm.

7. The on-chip antenna of claim 3, comprising a matching network arranged between the surface of the chip of the radio frequency identification tag and the first dielectric layer, and two connecting structures, each connecting structure comprising a first via extending through the first dielectric layer and electrically connecting the matching network to the conductive layer, and a second via extending through the second dielectric layer and electrically connecting the conductive layer to the respective terminals of the planar antenna, so as to provide an electrical connection between the matching network and the respective terminals of the planar antenna.

8. The on-chip antenna of claim 7, wherein the first via in the first dielectric layer and the second via in the second dielectric layer are selected from the group consisting of aluminum and copper.

9. The on-chip antenna of claim 7, wherein each terminal of the planar antenna is connected to the respective second via in the second dielectric layer through a respective pad overlapped by the terminal of the planar antenna.

10. The on-chip antenna of claim 9, wherein the area of the pad is at least equal to or larger than the area of the terminal of the antenna overlapping the pad.

11. The on-chip antenna of claim 2, comprising a matching network arranged between the surface of the chip of the radio frequency identification tag and the first dielectric layer, and two connecting structures, each connecting structure comprising a via extending through the first dielectric layer, the opening provided in the grounded shielding layer and the second dielectric layer and electrically connecting the matching network to the respective terminals of the planar antenna.

12. The on-chip antenna of claim 11, wherein the via extending through the first dielectric layer, the opening provided in the grounded shielding layer and the second dielectric layer is selected from the group consisting of aluminum and copper.

13. The on-chip antenna of claim 1, wherein the grounded shielding layer is a metal layer having a continuous surface.

14. The on-chip antenna of claim 1, wherein the grounded shielding layer is a meshed metal layer.

15. The on-chip antenna of claim 1,wherein the planar antenna and the grounded shielding layer are arranged over the entire surface of the chip of the radio frequency identification tag.

16. The on-chip antenna of claim 1, comprising a matching network arranged between the surface of the chip of the radio frequency identification tag and the first dielectric layer.

17. The on-chip antenna of claim 16, comprising two connecting structures, each connecting structure connecting the matching network to the planar antenna.

18. The on-chip antenna of claim 1, wherein the first dielectric layer and the second dielectric layer are selected from the group consisting of silica, silicon nitride, benzocyclobutene, polyimide and resin materials.

19. The on-chip antenna of claim 1, wherein the first dielectric layer has a thickness between 0.1 pm and 20 pm.

20. The on-chip antenna of claim 1, wherein the second dielectric layer has a thickness between 3 pm and 40 pm.

21. The on-chip antenna of claim 1, wherein the planar antenna is formed as an antenna strip arranged in a spiral shape on the second dielectric layer.

22. The on-chip antenna of claim 1, wherein the planar antenna is of copper.

23. The on-chip antenna of claim 1, wherein the planar antenna has a thickness between 1 pm and 20 urn.

24. The on-chip antenna of claim 1, comprising a passivation layer arranged on the planar antenna and the second dielectric layer.

25. The on-chip antenna of claim 24, wherein the passivation layer is a dielectric layer.

26. The on-chip antenna of claim 24, wherein the passivation layer is silicon nitride.

27. The on-chip antenna of claim 24, wherein the passivation layer has a thickness between 0.1 pm and 1 urn.

28. The on-chip antenna of claim 16, 11 or 7, wherein the matching network comprises at least one capacitor.

29. A radio frequency identification tag with an on-chip antenna comprising, in a stacked arrangement:
- a base portion including at least one integrated circuit;
- a matching network arranged on the base portion and electrically connected to the integrated circuit;
- a first dielectric layer arranged on the matching network;
- a grounded shielding layer arranged on the first dielectric layer;
- a second dielectric layer arranged on the grounded shielding layer; and
- a planar antenna arranged on the second dielectric layer above the grounded shielding layer and electrically connected to the matching network.

30. The radio frequency identification tag with an on-chip antenna of claim 29, wherein the planar antenna comprises two terminals and two openings are provided in the grounded shielding layer below the terminals.

31. The radio frequency identification tag with an on-chip antenna of claim 30, wherein a conductive layer is arranged within each of the openings in plane with the grounded shielding layer and isolated therefrom.

32. The radio frequency identification tag with an on-chip antenna of claim 31, further comprising two connecting structures, each connecting structure comprising a first via extending through the first dielectric layer and electrically connecting the matching network to the conductive layer, and a second via extending through the second dielectric layer and electrically connecting the conductive layer to the respective terminals of the planar antenna, so as to provide an electrical connection between the matching network and the respective terminals of the planar antenna.

33. The radio frequency identification tag with an on-chip antenna of claim 30, further comprising two connecting structures, each connecting structure comprising a via extending through the first dielectric layer, the opening provided in the grounded shielding layer and the second dielectric layer and electrically connecting the matching network to the respective terminals of the planar antenna.

34. The radio frequency identification tag with an on-chip antenna of claim 29, wherein the grounded shielding layer is electrically connected with a ground of the base portion.

35. The radio frequency identification tag with an on-chip antenna of claim 29, comprising a passivation layer arranged on the planar antenna and the second dielectric layer.

36. A method of fabricating an on-chip antenna on a chip for wireless communication, the method comprising:
- depositing a first dielectric layer on a surface of the chip of the radio frequency identification tag;
- depositing a shielding layer on the first dielectric layer;
- depositing a second dielectric layer on the shielding layer;
- depositing a planar antenna with two terminals on the second dielectric layer; and
- grounding the shielding layer.

37. The method of claim 36, comprising
patterning the shielding layer to form each an opening in the shielding layer below the respective terminals of the planar antenna.

38. The method of claim 37, comprising
patterning the shielding layer to form a conductive layer within each of the openings in plane with the shielding layer and isolated therefrom.

39. The method of claim 38, comprising
forming a matching network between the surface of the chip of the radio frequency identification tag and the first dielectric layer, and two connection structures, each connection structure comprising a first via extending through the first dielectric layer and electrically connecting the matching network to the conductive layer, and a second via extending through the second dielectric layer and electrically connecting the conductive layer to the respective terminals of the planar antenna, so as to provide an electrical connection between the matching network and the respective terminals of the planar antenna.

40. The method of claim 37, comprising
forming a matching network between the surface of the chip of the radio frequency identification tag and the first dielectric layer, and two connection structures, each connection structure comprising a via extending through the first dielectric layer, the opening provided in the shielding layer and the second dielectric layer and electrically connecting the matching network to the respective terminals of the planar antenna.

41. The method of claim 36, comprising
patterning the shielding layer to form a meshed layer.

42. The method of claim 36, comprising
forming a matching network between the surface of the chip of the radio frequency identification tag and the first dielectric layer.

43. The method of claim 42, comprising
forming two connecting structures, each connecting structure connecting the matching network to the respective terminals of the planar antenna.

44. The method of claim 36, comprising
depositing a passivation layer on the planar antenna and the second dielectric layer.

* * * * *